Patented Apr. 7, 1953

2,634,265

UNITED STATES PATENT OFFICE 2,634,265

RIBOFLAVIN DERIVATIVES AND PROCESS OF PREPARING SAME

Hugh M. Millen, Chicago, Ill., assignor to Vico Products Company, Chicago, Ill., a corporation of Illinois No Drawing. Application March 30, 1951, Serial No. 218,554

14 Claims. (Cl. 260—211.3)

My invention relates to the treatment of 9-polyhydroxyalkyl-isoalloxazines as, for example, 9-(1,1'-arabityl)-6,7-dimethyl-isoalloxazine; 9-(d,1'-ribityl)-7-monomethyl-isoalloxazine; 9-(d,1'-ribityl)-6-monomethyl-isoalloxazine; 9-(d,1'-ribityl)-6-ethyl-7-methyl-isoalloxazine; 9-(d-ribityl)-6,7-dimethyl-isoalloxazine (more commonly denoted by the term riboflavin). The invention is concerned particularly with the production of new and useful compositions comprising derivatives of said isoalloxazines having a high degree of solubility in water and other aqueous media and stability, on standing, against precipitation. The invention will be particularly described hereafter in connection with the treatment of riboflavin, which is perhaps the commonest of the 9-polyhydroxyalkyl-isoalloxazines, but it will be understood that it is applicable to the treatment of the class of 9-polyhydroxyalkyl-isoalloxazines generally.

It is well known that riboflavin, a member of the so-called water-soluble B complex group of vitamins, is characterized by relatively low solubility in water, only 0.11 mg. to 0.12 mg. of riboflavin being soluble in 1 cc. of water. The recommended minimal daily dose of riboflavin is 2 mg. It is generally considered desirable to have the required quantity of riboflavin in one teaspoon 4 to 5 cc.) when the product is used orally, and in 1 cc. when the product is used parenterally. It is obvious that these conditions cannot be met by solutions prepared by dissolving crystalline riboflavin in pure water.

The problem has been recognized and numerous attempts have been made to solve it. In general, two different types of approach have been made. In one, additives which aparently do not react with riboflavin but in whose presence riboflavin is more soluble have been utilized. Thus, for example, riboflavin is more soluble in the presence of various hydroxy-benzoic acids, as is disclosed in Patents Nos. 2,395,378 and 2,407,624. Such methods, while effective to increase the solubility of riboflavin in water, are, nevertheless, unsatisfactory because the hydrox-benzoic acids are physiologically active and, hence, are undesirable in parenteral solutions. In oral products, they have a distinctive taste, and, furthermore, their action frequently is nullified by the presence of other components commonly used in oral preparations.

The other general approach has been to react riboflavin with various types of compounds to produce water-soluble riboflavin derivatives. Thus, in Patent No. 2,111,491, certain phosphoric acid derivatives of riboflavin are disclosed. The disadvantages of practices such as are disclosed in said patent may be considered in the light of the fact that several hundred to several thousand parts of solvent are used per part of riboflavin in the production of the soluble derivatives. Any procedure requiring the handling of such enormous volumes, apart from any other factors, makes processing unwieldy and expensive and recovery difficult.

Analogous difficulties and objections obtain with respect to such proposals as are described in Patent No. 2,358,356, wherein condensation products of riboflavin with succinic acid or phthalic acid or their anhydrides are disclosed. Aside from the large volume of solvents utilized per part of riboflavin with the obviously concomitant disadvantage of such practice, long reaction periods are required and the solubility of the ultimately obtained product still is not all that it is desired to be.

Other procedures suggested, which have various disadvantages and objections either from the process conditions required to be used or from the standpoint of the character of the final products, or both are disclosed in Patents Nos. 2,332,548; 2,388,261; and 2,398,706.

In the application of Ben L. Maizel and Irving Gerson, Serial No. 762,820, filed July 22, 1947, now Patent No. 2,578,710, dated December 18, 1951, the preparation of certain lactic acid derivatives of riboflavin is disclosed, said derivatives being characterized by good solubility with high retentivity of their physiological activity. As there disclosed, lactic acid is reacted or condensed with riboflavin, under conditions where no diluents or solvents are employed, at a temperature in the range of about 140—190 degrees C., in the absence or substantial absence of water, a particularly preferred temperature range being about 150–175 degrees C.

The aforesaid application also discloses that, if the reaction between the riboflavin and the lactic acid is carried out in the presence of acetic anhydride, propionic anhydride, or phosphoric acids, such as so-called 100% phosphoric acid, $P_2O_5$, pyrophosphoric and other polyphosphoric acids, there is a reduction in the reaction time and, in addition, the acetic anhydride, propionic anhydride, and the phosphoric acid product appear to exert a protective action so that discoloration is inhibited and the reaction proceeds smoothly.

As further disclosed in said application, a substantial excess of lactic acid over that amount which enters into the reaction with the riboflavin and condenses therewith is used, good results being obtained, in most cases, with about 7 to 15 parts, by weight, of lactic acid per part, by weight, of riboflavin or other similar isoalloxazine. Starting, for example, with 85% lactic acid, particularly good results are obtained by using about 10 parts or slightly more, by weight, to each part by weight of riboflavin.

Reaction products made pursuant to the above-mentioned application are characterized by good solubility in water and other aqueous media and represent a distinct advance in the art. Thus, for example, aqueous solutions containing at least several mg., for example, 6 mg. up to more than 40 mg. of riboflavin per cc. are readily obtained. It has been found, however, that, under certain conditions, said riboflavin-lactic acid reaction products have a tendency to precipitate out, in part, from aqueous solutions containing the same or from sugar syrup or the like in which they have been incorporated.

My present invention is directed to improvements upon and over the invention of the above-mentioned application with particular relation to eliminating the tendency of the riboflavin-lactic acid condensation to precipitate from aqueous media. I have discovered that if the riboflavin-lactic acid condensation products produced in accordance with the aforementioned application are reacted with a non-toxic water-soluble aliphatic polyhydroxy substance, as hereafter described, final products are produced which retain their solubility in aqueous media over prolonged periods of time with retention of their riboflavin physiological activity.

The non-toxic water-soluble aliphatic polyhydroxy substance reacts with at least a substantial part of the excess or free lactic acid present in the products of the aforementioned patent application to form lactic acid esters. The reduction in the free acid content thus effected, in conjunction with the formation of a lactic acid ester of the aliphatic polyhydroxy substance, appears to account for the advantageous results which are produced in accordance with my invention.

The proportions of aliphatic polyhydroxy substance to riboflavin-lactic acid reaction product are, of course, variable, depending, among other things, upon the content of free acid in the riboflavin-lactic acid reaction product and upon the number of esterifiable hydroxyl groups present in the particular aliphatic polyhydroxy substance utilized. In a typical instance, where the riboflavin-lactic acid reaction product has a free acid content of about 65%, as made pursuant to the above-mentioned application, sufficient aliphatic polyhydroxy substance is added, and the esterification reaction carried out sufficiently, to reduce the free acid content to under about 30% and more advantageously to within the range of about 7% to 20%. Elevated temperatures are employed for the esterification but they should not be so high as to deleteriously affect the riboflavin-lactic acid reaction product or to cause charring or the like of any of the constituents. In general, esterification temperatures of the order of about 150–180 degrees C. are satisfactory in most cases. While reduced pressures and inert atmospheres can be utilized in carrying out the esterification reaction, resort to such procedures is ordinarily not necessary.

The water-soluble aliphatic polyhydroxy substances which can be utilized may be selected from a large number, typical examples of which are glycerol; glycols and polyglycols such as propylene glycol, di-propylene glycol and the like; polyglycerols such as diglycerol, triglycerol, tetraglycerol and mixtures thereof; sugars and sugar alcohols such as glucose, dextrose, sucrose, maltose, mannitol, sorbitol, dulcitol, arabitol, and derivatives thereof such as sorbide and mannide, and the like, as well as mixtures of any two or more thereof. I find that glycerol is especially satisfactory and, therefore, its use forms an especially preferred embodiment of my invention.

The following examples are illustrative of the practice of my invention. Various changes may be made therein with respect to proportions of ingredients, reaction temperatures and time, and the like, as will appear clear to those versed in the art in the light of my teachings without departing from the guiding principles which are taught herein.

*Example 1*

37.6 grams of riboflavin and 376 grams of 85% lactic acid were heated at 145–170 degrees C. for 18 minutes. To the resulting reaction product, 134 grams of D-sorbitol were added, over a period of 2 minutes, and the mass was then heated at 149–173 degrees C. for 70 minutes. A total of 301 grams of product was obtained containing 55 mg. of riboflavin per gram. The free acid content was 23%. The molal ratio of the reactants was 0.1 mol riboflavin, 3.51 mols lactic acid, and 0.7 mol D-sorbitol.

*Example 2*

37.6 grams of riboflavin and 376 grams of 85% lactic acid were heated at 154–156 degrees C. for 52 minutes. Thereupon, 240 grams of sucrose were added, over a period of 2 minutes, and the mass was heated at 155–158 degrees C. for 80 minutes. A total of 448 grams of a very viscous, almost solid product, was obtained, containing 56 mg. of riboflavin per gram. The free acid content was 27%. The molal ratio of the reactants was 0.1 mol riboflavin, 3.51 mols lactic acid, and 0.7 mol sucrose.

*Example 3*

This example was carried out as described in Example 2 except that 329 grams of sucrose was used and the mass was heated at 149–157 degrees C. whereby to produce an almost solid product. The final product contained 46 mg. of riboflavin per gram. The free acid content was 6.8%. The molal ratio of the reactants was 0.1 mol riboflavin, 3.51 mols lactic acid, and 0.96 mol sucrose.

*Example 4*

To 394 grams of a riboflavin-lactic acid reaction product produced as described in Example 1, there were added 450 grams of glycerol and the mass was then heated at 150–180 degrees C. for 2¼ hours. The final product was a smooth flowing liquid containing 52 mg. of riboflavin per gram. The free acid content was 12.2%. The molal ratio of the reactants was 0.1 mol riboflavin, 3.51 mols lactic acid, and 1.39 mols glycerol.

*Example 5*

To 414 grams of a riboflavin-lactic acid reaction product produced as described in Example 1, there were added 400 grams of glycerol and the mass was then heated at 149-170 degrees C. for 3½ hours. The final product contained 26 mg. of riboflavin per gram. The free acid content was 7.7%. The molal ratio of the reactants was 0.1 mol riboflavin, 3.51 mols lactic acid, and 3.95 mols glycerol.

*Example 6*

To 520 grams of a riboflavin-lactic acid reaction product produced as described in Example 1, there were added 264 grams of glycerol and the mass was then heated at 150-160 degrees C. for 2½ hours. The final product contained 56 mg. of riboflavin per gram. The free acid content was 21%. The molal ratio of the reactants was 0.1 mol riboflavin, 3.51 mols lactic acid, and 1.45 mols glycerol.

*Example 7*

To 200 grams of a riboflavin-lactic acid reaction product produced as described in Example 1, there were added 124 grams of ethylene glycol and the mass was then heated at 140-183 degrees C. for 2½ hours. The final product contained 39 mg. of riboflavin per ml. The free acid content was 9.05%. The molal ratio of the reactants was 0.1 mol riboflavin, 3.51 mols lactic acid, and 3.64 mols ethylene glycol.

As I have pointed out above, the products made in accordance with my present invention have excellent solubility in aqueous media and do not precipitate out therefrom even on standing or aging for prolonged periods of time. They are also characterized by enhanced solubility in certain media such as, for example, protein solutions, exemplified by yeast autolyzates, and sugar syrups to which yeast autolyzates have been added. In such solutions, for example, the products of my present invention can be added to produce compositions containing from 6 to 9 mg. or more of riboflavin per cc. Particularly desirable, in this connection, are the products of my invention wherein glycerol is employed. By way of sharp contrast, the products of the aforementioned application are not sufficiently soluble in the protein solutions and syrups containing the proteins to exceed about a few mg. of riboflavin per cc. and further, as previously stated, a part of the riboflavin precipitates out on standing. With respect to the products of my present invention, saturated aqueous solutions containing in excess of 20 mg. of riboflavin per cc. are easily prepared. In aqueous solutions containing about 10% by volume of ethyl alcohol, products made pursuant to my invention can be dissolved to produce solutions containing in excess of 17 mg. of riboflavin per cc. In all instances, as indicated above, such solutions are stable against precipitation over at least months of time.

Although preferred embodiments of my invention have been described in detail herein, it will be understood that various modifications can be made without departing from the spirit of my invention. Among other things, for example, it will be understood that the appended claims encompass the production of the improved products irrespective of whether such materials as acetic anhydride, phosphoric acids, and the like are used in the preparation of the intermediate riboflavin-lactic acid reaction product.

What I claim as new and desire to protect by Letters Patent of the United States is:

1. In a process of preparing water-soluble products which includes heating 1 part, by weight, of a 9-polyhydroxyalkyl-isoalloxazine with at least several parts, by weight, of lactic acid, in the substantial absence of water, at a temperature of the order of about 140-190 degrees C., the improvement which comprises esterifying at least a substantial part of the free acid content of said reaction product by reacting the same with a non-toxic water-soluble aliphatic polyhydroxy substance.

2. In a process of preparing water-soluble products which includes heating 1 part, by weight, of a 9-polyhydroxyalkyl-isoalloxazine with about 7 to 15 parts, by weight, of lactic acid, in the substantial absence of water, at a temperature of the order of about 150 degrees C. to about 160 degrees C. until the reaction product obtained is soluble in water to form a substantially clear solution containing not less than about 6 mg. of said isoalloxazine per cc., the improvement which comprises esterifying at least a substantial part of the free acid content of said reaction product by reacting the same with a non-toxic water-soluble aliphatic polyhydroxy substance.

3. In a process of preparing water-soluble products which includes heating 1 part, by weight, of riboflavin with at least several parts, by weight, of lactic acid, in the substantial absence of water, at a temperature of the order of about 140-190 degrees C., the improvement which comprises esterifying at least a substantial part of the free acid content of said reaction product by reacting the same with a non-toxic water-soluble aliphatic polyhydroxy substance.

4. In a process of preparing water-soluble products which includes heating 1 part, by weight, of riboflavin with about 10 to about 12 parts, by weight, of lactic acid, in the substantial absence of water, at a temperature of the order of about 150 degrees C. to about 175 degrees C. until the reaction product obtained is soluble in water to form a substantially clear solution containing not less than about 6 mg. of said riboflavin per cc., the improvement which comprises esterifying at least a sufficient amount of the free acid content of said reaction product by reacting the same with a non-toxic water-soluble aliphatic polyhydroxy substance whereby to produce a final product having a free acid content below 30%.

5. A process in accordance with claim 4 wherein the water-soluble aliphatic polyhydroxy substance is glycerol.

6. A process in accordance with claim 4 wherein the water-soluble aliphatic polyhydroxy substance is a sugar alcohol.

7. A process in accordance with claim 4 wherein the water-soluble aliphatic polyhydroxy substance is sorbitol.

8. A process in accordance with claim 4 wherein the water-soluble aliphatic polyhydroxy substance is propylene glycol.

9. A water-soluble product resulting from reacting 1 part, by weight, of a 9-polyhydroxyalkyl-isoalloxazine with at least several parts, by weight, of lactic acid, in the substantial absence of water, at a temperature between about 140 degrees C. and about 190 degrees C., and then esterifying at least a substantial part of the free acid content of said 9-polyhydroxyalkyl-isoalloxazine-lactic acid reaction product by reacting the same with a non-toxic water-soluble aliphatic polyhydroxy substance.

10. A product, having a solubility in water of not less than 6 mg. per cc., resulting from reacting 1 part, by weight, of riboflavin with about 10 to about 12 parts, by weight, of lactic acid, in the substantial absence of water, at a temperature between about 150 degrees C. and about 175 degrees C., and then esterifying at least a sufficient amount of the free acid content of said riboflavin-lactic acid reaction product by reacting the same with a non-toxic water-soluble aliphatic polyhydroxy substance whereby to produce a final product having a free acid content below 30%.

11. A product in accordance with claim 10 wherein the water-soluble aliphatic polyhydroxy substance is glycerol.

12. A product in accordance with claim 10 wherein the water-soluble aliphatic polyhydroxy substance is a sugar alcohol.

13. A product in accordance with claim 10 wherein the water-soluble aliphatic polyhydroxy substance is sorbitol.

14. A product in accordance with claim 10 wherein the water soluble aliphatic polyhydroxy substance is propylene glycol.

HUGH M. MILLEN.

REFERENCES CITED

The following references are of record in the file of this patent:

UNITED STATES PATENTS

| Number | Name | Date |
|---|---|---|
| 1,173,317 | Seidell | Feb. 29, 1916 |
| 1,701,200 | Willstatter | Feb. 5, 1929 |
| 2,358,356 | Stein et al. | Sept. 19, 1944 |
| 2,407,624 | Bird et al. | Sept. 17, 1946 |
| 2,423,074 | Zentner | June 24, 1947 |
| 2,499,003 | Moos et al. | Sept. 7, 1948 |

FOREIGN PATENTS

| Number | Country | Date |
|---|---|---|
| 376,149 | Great Britain | July 7, 1932 |